United States Patent
Chacko et al.

(10) Patent No.: US 10,109,421 B2
(45) Date of Patent: Oct. 23, 2018

(54) POLYMERIZATION METHOD FOR PREPARING CONDUCTIVE POLYMER

(71) Applicant: Kemet Electronics Corporation, Simpsonville, SC (US)

(72) Inventors: Antony P Chacko, Simpsonville, SC (US); Yaru Shi, Simpsonville, SC (US); John Ols, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 402 days.

(21) Appl. No.: 14/661,662

(22) Filed: Mar. 18, 2015

(65) Prior Publication Data

US 2015/0194263 A1   Jul. 9, 2015

Related U.S. Application Data

(62) Division of application No. 13/749,737, filed on Jan. 25, 2013, now Pat. No. 9,030,806.

(Continued)

(51) Int. Cl.

| | |
|---|---|
| *H01G 9/025* | (2006.01) |
| *H01G 4/08* | (2006.01) |
| *H01G 9/00* | (2006.01) |
| *C08L 65/00* | (2006.01) |
| *H01G 9/028* | (2006.01) |
| *H01B 1/12* | (2006.01) |
| *C08G 75/06* | (2006.01) |
| *H01G 4/005* | (2006.01) |
| *C08L 25/18* | (2006.01) |
| *C08L 71/02* | (2006.01) |

(52) U.S. Cl.
CPC ............... *H01G 4/08* (2013.01); *C08G 75/06* (2013.01); *C08L 65/00* (2013.01); *H01B 1/127* (2013.01); *H01G 4/005* (2013.01); *H01G 9/0029* (2013.01); *H01G 9/0036* (2013.01); *H01G 9/025* (2013.01); *H01G 9/028* (2013.01); *C08G 2261/1424* (2013.01);
(Continued)

(58) Field of Classification Search
CPC ........ H01G 9/028; H01G 9/012; H01G 9/038; H01G 9/032; H01G 9/15; H01G 9/025; H01G 4/005; H01G 4/08
See application file for complete search history.

(56) References Cited

U.S. PATENT DOCUMENTS

| | | | |
|---|---|---|---|
| 5,021,193 A * | 6/1991 | Armes | C08G 61/124 252/500 |
| 5,300,575 A | 4/1994 | Jonas et al. | |

(Continued)

FOREIGN PATENT DOCUMENTS

| | | |
|---|---|---|
| CN | 101230129 A | 7/2008 |
| WO | WO 2010/098111 | 8/2010 |

OTHER PUBLICATIONS

PCT International Search Report; dated May 16, 2013; prepared by Korean Intellectual Property Office; Applicant: KEMET Electronics Corporation.

*Primary Examiner* — Nguyen Ha
(74) *Attorney, Agent, or Firm* — Joseph T. Guy; Patent Filing Specialist, Inc.

(57) ABSTRACT

A improved process for preparing a conductive polymer dispersion is provided as is an improved method for making capacitors using the conductive polymer. The process includes providing a monomer solution and shearing the monomer solution with a rotor-stator mixing system comprising a perforated stator screen having perforations thereby forming droplets of said monomer. The droplets of monomer are then polymerized during shearing to form the conductive polymer dispersion.

9 Claims, 5 Drawing Sheets

Related U.S. Application Data

(60) Provisional application No. 61/590,381, filed on Jan. 25, 2012.

(52) U.S. Cl.
CPC ............... *C08G 2261/3321* (2013.01); *C08G 2261/3323* (2013.01); *C08L 25/18* (2013.01); *C08L 71/02* (2013.01)

(56) References Cited

U.S. PATENT DOCUMENTS

| | | | |
|---|---|---|---|
| 5,807,506 A * | 9/1998 | Cunningham | C08F 292/00 |
| | | | 252/511 |
| 6,000,840 A | 12/1999 | Paterson | |
| 6,359,030 B1 * | 3/2002 | Tsuda | C09D 127/16 |
| | | | 523/201 |
| 7,270,871 B2 | 9/2007 | Jiang et al. | |
| 7,960,499 B2 | 6/2011 | Watanabe | |
| 7,990,684 B2 * | 8/2011 | Sugihara | C08L 61/06 |
| | | | 361/525 |
| 2008/0023674 A1 | 1/2008 | Jiang et al. | |
| 2011/0049433 A1 | 3/2011 | Jonas et al. | |
| 2011/0233450 A1 * | 9/2011 | Nobuta | C08L 79/04 |
| | | | 252/62.2 |
| 2012/0003467 A1 * | 1/2012 | Suzuki | B32B 33/00 |
| | | | 428/336 |
| 2012/0300370 A1 * | 11/2012 | Chacko | H01G 9/028 |
| | | | 361/528 |
| 2014/0350186 A1 * | 11/2014 | Hatae | C08F 265/06 |
| | | | 525/187 |

\* cited by examiner

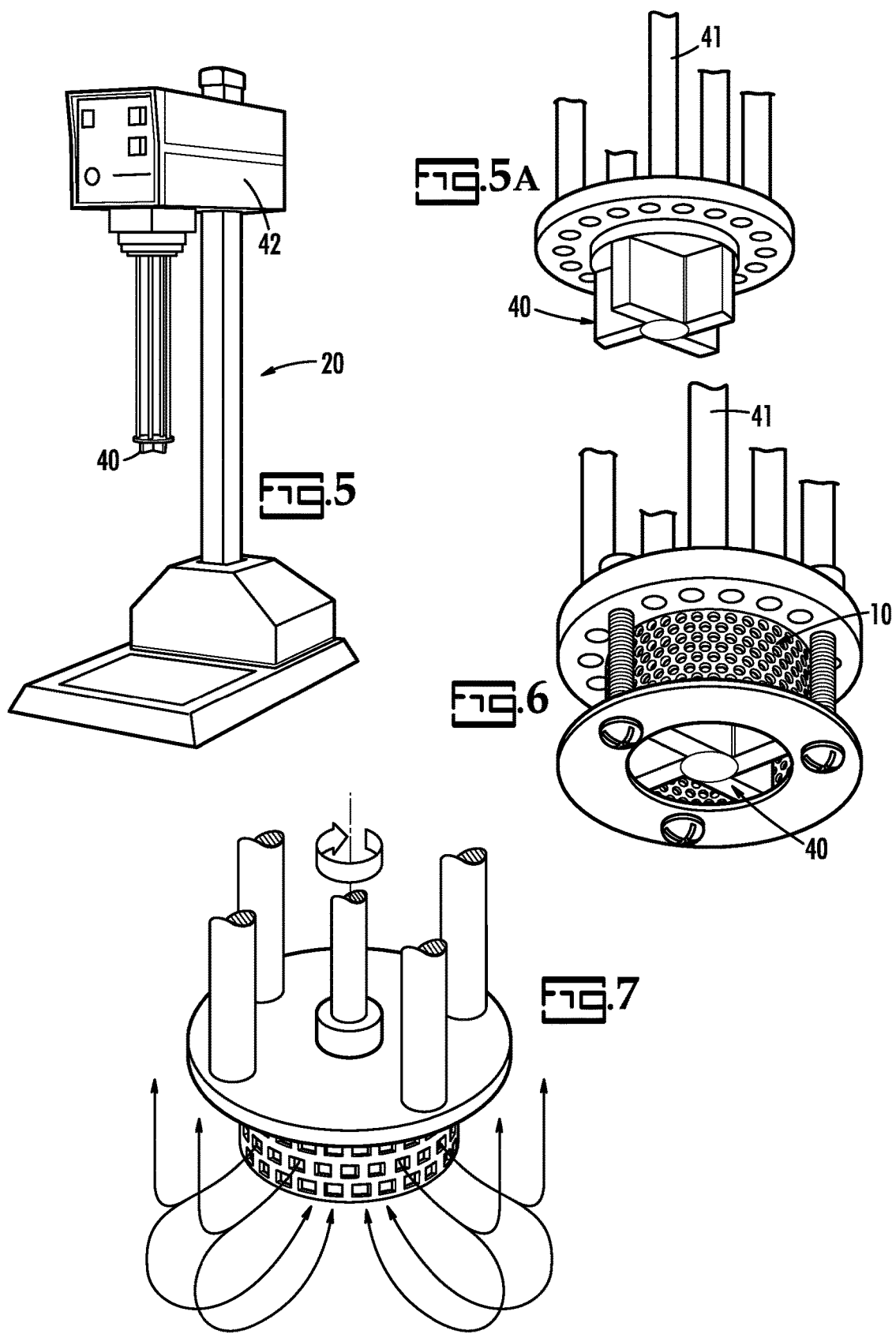

POLYMERIZATION METHOD FOR PREPARING CONDUCTIVE POLYMER

CROSS-REFERENCE TO RELATED APPLICATIONS

The present application claims priority to U.S. Provisional Patent Appl. No. 61/590,381 filed Jan. 25, 2012 which is incorporated herein by reference.

BACKGROUND

The present invention is related to an improved polymerization method for preparing conductive polymer dispersions and an improved solid electrolytic capacitor formed thereby. More specifically, the present invention is related to the preparation of an improved conductive polymer dispersion with controllable particle size, specifically a particle size below about 100 nm, without additional post polymerization homogenization.

Solid electrolytic capacitors are widely used throughout the electronics industry. In high voltage applications, solid electrolytic capacitors with a solid electrolyte, formed by conductive polymer dispersions, give excellent high voltage performance compared to conductive polymer cathodes formed in-situ. These conductive polymer dispersions are prepared by a number of process steps including polymerization, purification, filtration, homogenization, evaporation, etc. Descriptions of these processes are provided in U.S. Pat. Nos. 5,300,575; 7,990,684; 7,270,871 and 6,000,840; U.S. Patent Publication No. 2011/0049433 and PCT Publication WO 2010/089111 each of which is incorporated herein by reference.

Capacitors and methods of making capacitors are provided in U.S. Pat. Nos. 7,990,683; 7,754,276 and 7,563,290 each of which is incorporated herein by reference.

The production process described in the prior art has the disadvantage of additional process steps, such as high-pressure homogenization, which are required to lower the particle size of the dispersion.

Polymerization of conductive polymer dispersion reactions are reported to be performed by various mixing methods such as magnetic stirring, stirring with agitators, high shear mixing and ultrasound irradiation. All of these mixing methods, except ultrasound irradiation, produce particle sizes in the range of 150-400 nm. A post polymerization homogenization is done after the polymerization to produce particle sizes below 150 nm.

Ultrasound irradiation is claimed to produce particle sizes below 100 nm directly during the polymerization. Although ultrasound induced polymerization has been used for many decades in synthetic polymer chemistry, this method of polymerization has not yet reached industrial maturity. Scaling up of ultrasound-induced polymerization is theoretically possible but issues, such as the efficient creation of cavitation bubbles, are difficult to achieve on an industrial scale. A further limitation to the application of ultrasound is the fact that several effects, such as radical formation and polymer scission or polymer degradation, may take place simultaneously which affects the long term performance of the polymer.

In all of these polymerization processes, there was neither a discussion nor a proposed method to control particle size during the polymerization method. Controlling the monomer droplet formation is very important to control the particle size. In various applications, such as a conductive polymers in solid electrolytic capacitors, there is a need for dispersions with various and controlled particle sizes. It would be advantageous if the polymerization could be controlled so as to control particle size or tune the particle size for a given application.

Thus, there is a need for a process for preparing conductive polymers with controllable particle sizes and with a lower particle size with less process steps without adversely affecting the polymer and device performance.

Commercially available intrinsically conductive polymer (ICP) dispersions are known. An exemplary ICP is polyethylene dioxythiophene:polystyrene sulfonic acid (PEDT:PSSA) dispersion, which is commercially available as Clevios P from Hereaus, which are stabilized by electrostatic or ionic stabilization with polycations stabilized with polyanion. Commercially available formulated ICP dispersions such as Clevios KV2, which is also commercially available from Hereaus and commonly used for solid electrolytic capacitors, are based on these types of ionically stabilized ICP dispersions.

There are several disadvantages for ionically stabilized dispersions including coagulation or gel particle formation of the higher solids dispersions over storage. In addition any changes in the electrolyte concentration could cause coagulation or gel particle formation. Due to the above disadvantages, some of the commercial formulated ICP dispersions have to be restabilized in some cases by more energy input into the system. The process of restabilization affects the performance as well as processing cost. Another aspect of the formulated ICP dispersions is that polymeric binders are added to the post polymerized dispersion to improve the coating performance for solid electrolytic capacitors. The presence of any unwanted electrolytes or ionics in these binders can affect the stability of the dispersion as well as affect the long term performance of the device. Electrostatic stabilization is known to have some disadvantages over other methods of stabilization as described in Polymeric Materials Encyclopedia, CRC Press, Vol. 1, Page 8025.

SUMMARY OF THE INVENTION

It is an object of the invention to provide an improved method of forming conductive polymer.

It is another object of the invention to provide an improved method of polymerization, particularly, a polymerization process in which the particle size is controlled in a rotor-stator mixing system.

It is another object of the invention to provide an improved method of polymerization, particularly, a polymerization process in which the particle size is controlled by the choice of the perforated stator screens in a rotor-stator mixing system.

Another object of the invention is to prepare submicron droplets of monomer during the polymerization by using stator screens with hole diameters of no more than about 6 mm, preferably no more than about 2 mm, and even more preferably no more than about 1 mm.

Another object of the invention is to prepare submicron droplets of monomer during the polymerization by using stator screens with multiple stator holes and preferably higher than 90 holes.

Another object of the invention is to prepare conductive polymer dispersions with a controllable particle size below 200 nm.

Another object of the invention is to prepare a conductive polymer dispersion with a mean particle size below about 100 nm.

Another object of the invention is to prepare a PEDOT: Polyanion polymer dispersion with a mean particle size below about 100 nm.

Another objective of the invention is to prepare solid electrolytic capacitors with PEDOT dispersion coatings with particle sizes below about 100 nm A particular advantage of the invention is provided by decreasing the number of process steps. Another advantage is a scalable industrial process which can produce uniform particle size.

These and other advantages, as will be realized, are provided in a process for preparing a conductive polymer dispersion. The process includes providing a monomer solution and shearing the monomer solution with a rotor-stator mixing system comprising a perforated stator screen having perforations thereby forming droplets of said monomer. The droplets of monomer are then polymerized during shearing to form the conductive polymer dispersion.

Yet another embodiment is provided in a process for preparing a conductive polymer dispersion. The process includes providing a monomer and mechanically mixing the monomer to form droplets comprising the monomer. The droplets of monomer in are polymerized by an oxidizer thereby forming conductive polymer particles with a particle size of no more than 200 nm. In a particularly preferred embodiment the conductive polymer is used as the cathode of a capacitor.

Yet another embodiment is provided in a method for preparing a dispersion of conducting polymer. The process includes providing a solution comprising a monomer and a polyanion. The solution is sheared at a shear rate of at least 10,000 to no more than 800,000 sec$^{-1}$ to form droplets. The droplets are mixed with at least one oxidizing agent thereby polymerizing the monomer in the droplet to form the dispersion of polymer.

Yet another embodiment is provided in a method of forming a capacitor. The process includes providing a solution comprising a monomer, a polyanion and a steric stabilizer and shearing the solution at a shear rate of 10,000 to 800,000 sec$^{-1}$ to form droplets. The droplets are mixed with at least one oxidizing agent thereby polymerizing the droplet of monomer to form a polymer. An anode is provided with a dielectric over the anode and a cathode of the polymer is formed on the dielectric.

Yet another embodiment is provided in a method of forming a capacitor. The method includes providing a solution comprising a monomer, a polyanion and a steric stabilizer and shearing the solution at a shear rate of 10,000 to 800,000 sec$^{-1}$ to form droplets which are mixed with at least one oxidizing agent. The droplets of monomer are polymerized. An anode with a dielectric over the anode is provided and a cathode of the polymer is formed over the dielectric.

BRIEF DESCRIPTION OF FIGURES

FIG. 5 is a schematic perspective view of part of an embodiment of the invention.

FIG. 5A is a schematic perspective bottom view of a portion of embodiment of FIG. 5.

FIG. 6 is a schematic perspective bottom view of a portion of a mixer of the invention.

FIG. 7 is a schematic flow diagram of material in a mixer of the invention.

DESCRIPTION

The present invention is related to an improved polymerization method for conductive polymer dispersions. More particularly, the present invention is related to the use of perforated stator screens preferably with equivalent hole diameters of at least 0.25 mm no more than about 6 mm, more preferably no more than about 3 mm an even more preferably no more than about 2 mm and even more preferably no more than about 1 mm to control the monomer droplet size during polymerization. The perforations preferably have minimal dimensions of at least 1.0 mm to no more than 3.0 mm and more preferably at least 1.2 mm to no more than 2.5 mm.

The improved polymerization method eliminates the need for post polymerization homogenization steps. The improved polymerization method using the preferred stator screens provides a uniform droplet size resulting in average polymer particle sizes below about 200 nm, more preferably 150 nm and even more preferably below about 100 nm.

It has now been found that, surprisingly, conductive polymer dispersions having a lower, and controllable, particle size can be prepared during polymerization, without additional process steps, when the polymerization is carried out using a rotor stator mixing system with perforated screen stators preferably with hole diameters below about 6 mm. The dispersion may further comprise at least one polyanion.

The invention will be described with reference to the various figures which are an integral, non-limiting, component of the disclosure. Throughout the various figures similar elements will be numbered accordingly.

Figure 1:
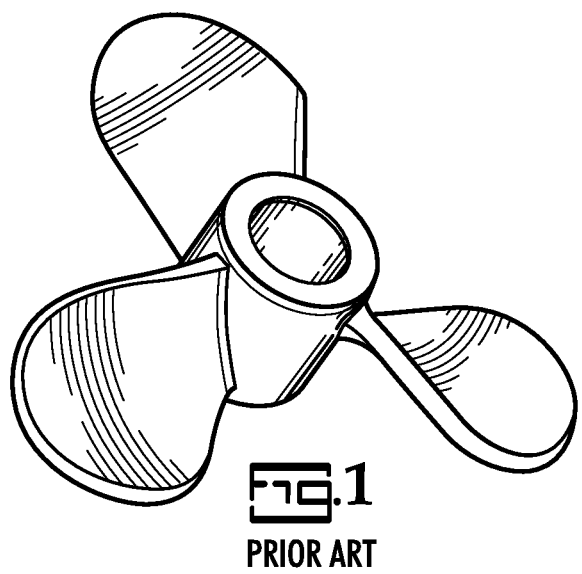
FIG. 1 is a schematic perspective view of a mixing impellor used in comparative examples.
Figure 2:
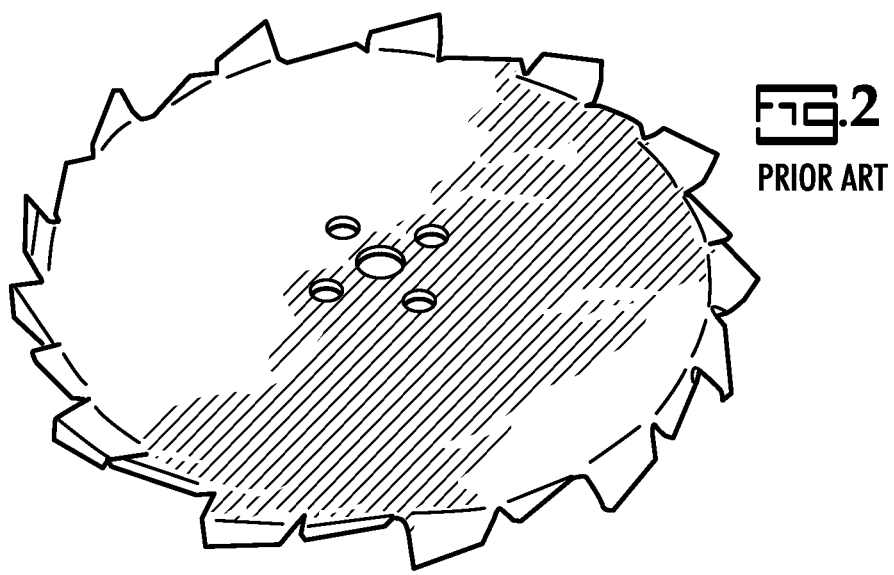
FIG. 2 is a schematic perspective view of a high shear impellor used in comparative examples.

FIGS. 1 and 2 illustrate prior art mixing impellors which offer poor control over particle size of the polymer.

Figure 3:
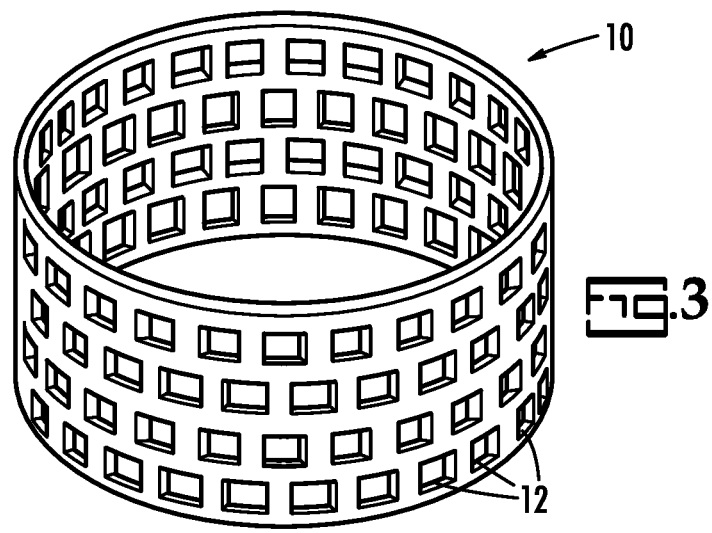
FIG. 3 is a schematic perspective view of square hole perforated stator screen used in inventive examples.
Figure 4:
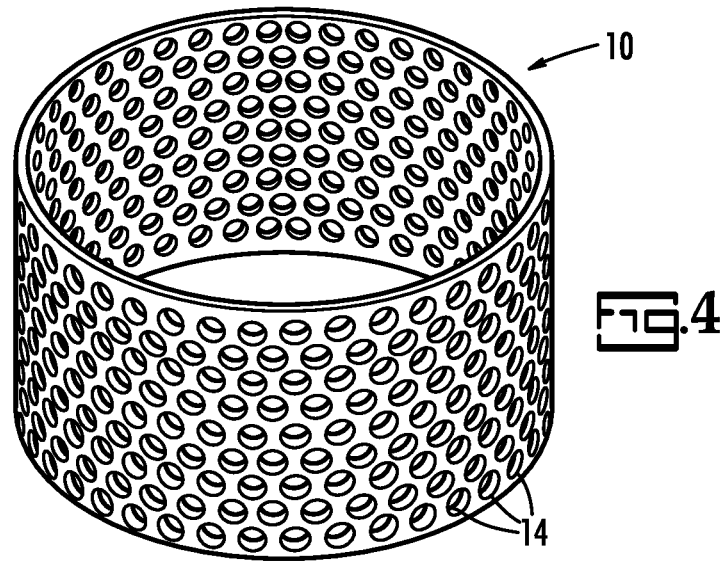
FIG. 4 is a schematic perspective view of a circular hole perforated stator screen used in inventive examples.

FIGS. 3 and 4 illustrate stator screens, 10, with square holes, 12, and circular holes, 14. The stator screens, 10, are cylindrical and arranged relative to a paddle impellor in an orientation such that material will be forced through the stator screen thereby imparting shear on the material. The stator screens diameter selected to provide sufficient tip speed to achieve sufficient shear. Tip Speed is defined as:

Tip speed=π×D×N wherein:

π is a known constant which is the ratio of a circle's circumference to its diameter;

D is the equivalent diameter of the rotor.

Figure 8:
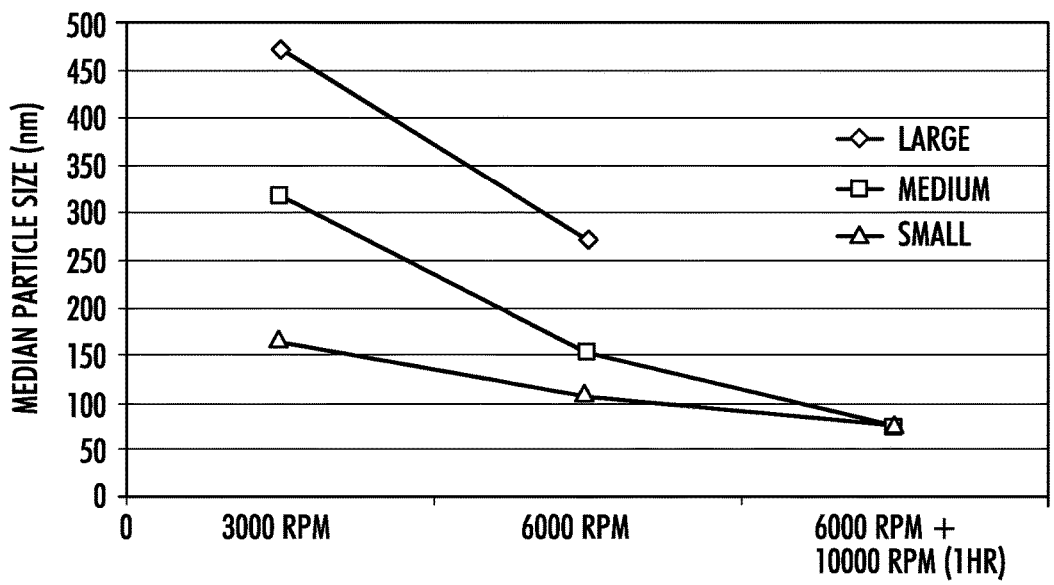
FIG. 8 is a graphical illustrations of advantages of the invention.

N is the rotation rate of the mixer. As illustrated in FIG. 8, the larger the hole size the higher the rotation rate must be to achieve adequate shear and particle size wherein 3000 rpm represents a shear rate of about 21,800 sec$^{-1}$; 6000 rpm represents a shear rate of about 43,600 sec$^{-1}$ and 10000 rpm represents a shear rate of about 72,600 sec$^{-1}$. FIG. 8 also illustrates the relation between particle size and rotational speed using Silverson lab mixer L5MA with a rotor diameter of 1.2 inches, stator screen with large (6 mm), medium (2.4 mm), and small (1.6 mm) holes.

Shear rate is defined herein as the tip speed/rotor stator gap. By way of example, For a rotor diameter of 1.25 inches and rotational speed of 6000 RPM, tip speed is 42 ft/meter. With rotor gap of 0.009 inches, shear rate is calculated as 51000 sec$^{-1}$. The shear rate is preferably at least about 10,000 to 800,000 sec$^{-1}$ and more preferably at least 40,000 to 75,000 sec$^{-1}$.

Rotor/stator mixers are comprised of a rotor turning at high speeds within a stationary stator. As the blades rotate, materials are continuously drawn into one end of the mixing head and expelled at high velocity through the openings of the stator. The resulting hydraulic shear reduces the size of suspended droplets. Inline high shear mixers are used in an inline configuration wherein they behave like a centrifugal pump. The basic single-stage inline high shear mixer consists of a four-blade rotor that turns at high speeds within a stationary stator. Rotor tip speeds between 3,000 to 4,000 ft/min are typical. Rotor/stator mixers are offered with a variety of interchangeable stator designs.

The "multi-stage" rotor/stator consists of 2-4 rotor/stator pairs nested concentrically, mix material moves outward from the center of the multi-stage unit, and it is subjected to a quick succession of shearing events. Example of the multistage rotor/stator mixer are the ultrahigh shear rate mixers. The X-Series head from Charles Ross and Sons and exemplified in U.S. Pat. No. 5,632,596, consists of concentric rows of intermeshing teeth. The droplets enter at the center of the stator and move outward through radial channels in the rotor/stator teeth. The combination of extremely close tolerances and very high tip speeds (11,300 fpm or higher) subjects the droplets to intense shear in every pass through the rotor/stator. The gap between adjacent surfaces of the rotor and stator are adjustable from 0.010" to 0.180" for very high shear rates such as 750,000 sec$^{-1}$.

The MegaShear head, exemplified in U.S. Pat. No. 6,241,472, is capable of the highest peak shear and throughput levels. It consists of parallel semi-cylindrical grooves in the rotor and stator towards which product is forced by high velocity pumping vanes. Different streams are induced within the grooves which collide at high frequency before exiting the mix chamber.

Such high shear batch, inline, single stage, and multistage rotor-stator mixers are available from various vendors including Charles Ross & sons, Silverson, etc.

The creation of a small particle sizes during polymerization involves generating small droplets of monomer through a combination of mechanical energy using a rotor-stator mixing system to manipulate the droplet size with an appropriate choice of perforated stator screens, with specific holes having specific equivalent diameters. It is preferable to stabilize the resulting droplets with surfactant. In conventional polymerization the monomer droplets are large which limits the particle size of the polymer. The instant invention includes a mixing system in which the mixer produces intense hydraulic shear wherein the monomer droplets are forced through perforations in the stator screen thereby reducing the monomer droplets into very small droplet sizes. The very small monomer droplets are stabilized by polyanions and the polymerization is believed to be initiated around the monomer droplet wherein the droplet size during polymerization is correlated to the polymer particle size.

Another advantage of this process is that conductive polymer dispersions with higher viscosity can be prepared effectively with the method of this invention. This is advantageous due to elimination of the step of evaporation typically required to achieve a viscosity suitable for forming a conductive coating as the cathode of a solid electrolytic capacitor.

When the polymer dispersion is to be used to form the cathode of a capacitor the viscosity of a polymer dispersion must be sufficiently high to adequately cover the corners and edges of the underlying dielectric. Unfortunately, conventional polymerization techniques are more effective in producing low viscosity dispersions. It has therefore been standard practice to form the polymer at a lower viscosity followed by evaporation to achieve a suitable viscosity. The present invention avoids this by allowing for polymer dispersion formation at higher viscosities.

The viscosities of the polymer dispersion is preferably at least 200 cP @ 20 RPM to no more than 4000 cP @ 20 RPM at ambient temperature and preferably at least 2000 to 4000 cP @ 20 RPM at ambient temperature.

The polymer dispersion preferably has a percent solids of at least 1.0 wt % to insure adequate viscosity. More preferably, the polymer dispersion has a percent solids of at least 1.3 wt % to no more than 5 wt %. Above about 5 wt % the dispersion does not flow adequately for forming a conductive layer. More preferably, the polymer dispersion has a percent solids of at least 1.7 wt % to no more than 3.5 wt %.

The dispersion, and polymerization preferably occurs at a temperature of at least about 15° C. to no more than about 35° C. Below a temperature of about 15° C. the polymerization rate is very slow and above about 35° C. conductivity and viscosity can be adversely affected.

Though not limited thereto, the present invention is particularly suitable for use in forming conductive polymers of polyanilines, polypyrroles and polythiophenes each of which may be substituted. A particularly suitable monomer for demonstration of the teachings herein is 3,4-ethylenedioxythiophene wherein beta-site polymerization is blocked.

A criteria for polymeric steric stabilizers for ICP dispersion polymerization is that they must be stable during low pH polymerization conditions, stable to oxidizing agents, and that they do not interfere with polymerization of the monomer. An exemplary steric stabilizer is a high molecular weight polyethylene oxide and their copolymers which are preferred as the steric stabilizer due to their stability in low pH reaction conditions. Another exemplary steric stabilizer is polydimethyl siloxane-polyethylene oxide (PDMS-PEO) block copolymer. An advantage of the PDMS-PEO copolymer is that the PDMS block could provide moisture resistance in addition to steric stabilization.

PEDT:PSSA dispersions can be further stabilized by polymeric steric stabilizers during the polymerization. Coagulation or gel formation is significantly reduced due to the insensitivity of the sterically stabilized system to the fluctuations and increases in electrolyte concentration. In addition, high solids dispersions can be produced by this method due to the higher stabilizing effect of steric stabilizers.

The polystyrene sulfonic acid has a preferred molecular weight of at least about 500 to no more than about 500,000. Below a molecular weight of about 500 film integrity can be affected and above a molecular weight of about 500,000 conductivity and viscosity can be adversely affected.

Particularly preferred polymeric steric stabilizers comprise linking groups which, upon formation of a coated layer, crosslink thereby providing an interlinked matrix which functions as a binder thereby providing a coated layer with a suitable structural integrity. Steric stabilzers with a reactive functionality can be employed for post polymerization crosslinking with polyanion. Any reactive steric stabilizer with a reactive functionality which is stable during the polymerization reaction can be used. Examples of such reactive stabilizers are hydroxyl and dihydroxy end capped polybutadiene. Precursors of reactive steric stabilizer can also be employed for post polymerization activation of the steric stabilizer reactive group.

As used herein, the terminology "steric stabilizer" refers to compounds which are adsorbed to the polymer particles of the dispersion and protective layers around the respective particles to prevent agglomeration of the particles.

Suitable steric stabilizers include, for example, protective colloids and nonionic surfactants having a hydrophilic/lipophilic balance (HLB) greater than about 10. Hydrophilic/lipophilic balance is a measure of the degree to which a material is hydrophilic or lipophilic.

For the purposes of the present invention the Griffin's method is used for determining the hydrophilic/lipophilic balance wherein HLB is defined as:

$$HLB = 20 * Mh/M$$

wherein:
Mh is the molecular mass of the hydrophilic portion of the molecule and M is the molecular mass of the molecule. An HLB value of greater than about 10 is a water soluble, lipid insoluble, molecule.

Suitable protective colloids include polyethylene oxide, fully hydrolyzed polyvinyl alcohol, partially hydrolyzed poly(vinyl alcohol), poly(vinyl pyrollidone), hydroxyethyl cellulose, polyethylene oxide copolymers and their derivatives, and mixtures thereof. Polyethylene oxide is preferred. Suitable nonionic surfactants include ethoxylated alkyl phenols, ethoxylated acetylenic diols, polyethylene oxide-propylene oxide block copolymers as well as mixtures thereof. Steric stabilizers are preferably added to the polymerization reaction as solutions in water or other polar solvents such as dimethyl sulfoxide, ethylene glycol, N-methyl pyrrolidone, etc.

Another advantage of the use of stator rotors during polymerization is that no post polymerization binder addition is necessary since the polymeric steric stabilizers provide adequate coating performance. Coatings prepared from conventional ICP dispersions prepared by conventional methods without binders tend to crack primarily due to the presence of agglomerated particles. Agglomeration of the particles is significantly reduced by the use of steric stabilizers in the polymerization reaction. The absence of post polymerization binder also eliminates the presence of unwanted electrolytes or ionics, as part of the binders, in the final formulation. Post polymerization binder addition in prior art dispersions may not produce an intimately mixed formulation which could affect percolation and thus equivalent series resistance (ESR) if used as the cathode in a capacitor. In contrast, polymerization with polymeric steric stabilizers results in a molecularly mixed miscible formulation.

Purification of the polymer by ion exchange is preferred resulting in a final formulation with insignificant amounts of mobile ionic species. Another advantage is that the final formulation is produced in one step.

The mixing is preferably done in an inert atmosphere with nitrogen being preferred due to cost considerations. A higher flow rate is preferred. While not limited to any theory, it is hypothesized that the inert atmosphere minimizes oxidation.

The stator rotor will be described with reference to FIGS. 5 and 6. A mixer, 20, is illustrated in FIGS. 5 and 5A wherein a paddle mixer, 40, is attached to a shaft, 41, coupled to a motor, 42. As illustrated in FIG. 6, which is a perspective bottom view of the stator rotor, the stator screen, 10, encases the paddle mixer. As the paddle mixer rotates material flows into the interior of the stator screen and is forced out through the holes of the stator screen, as depicted in FIG. 7, thereby causing shear which creates small droplets of monomer. The monomer is then polymerized to form polymer particles with a particle size which is correlated to the droplet size.

Figure 9:
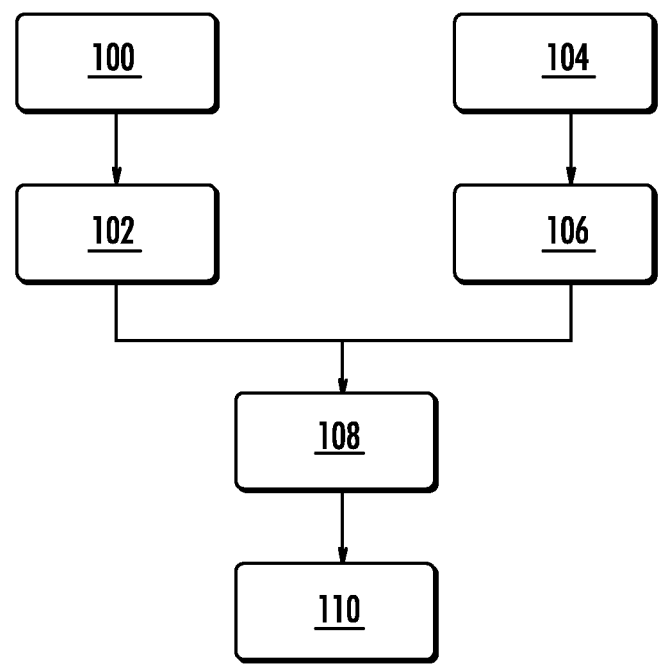
FIG. 9 is a flow chart representation of an embodiment of the invention.

The process for forming a capacitor will be described with reference to FIG. 9 wherein the process is represented schematically. In FIG. 9, a droplet of monomer is formed at 100 preferably by a stator rotor as defined herein. The droplets are then polymerized to form a polymer at 102. An anode is prepared at 104 wherein the anode is a conductor, and preferably a valve metal. A dielectric is formed on the anode at 106 wherein the preferred dielectric is an oxide of the anode. A conductive layer of the polymer is formed on the dielectric at 108 thereby forming a conductive couple with a dielectric there between. The polymer may be polymerized to form a polymer dispersion wherein the polymer dispersion is coated on the dielectric such as by dipping. Alternatively, the polymer may be subjected to shearing, as set forth herein, to form droplets wherein the droplets are deposited on the surface of the dielectric and polymerized in-situ. The capacitor is finished at 110 wherein finishing can include but is not limited to testing, forming external terminations, encapsulating and the like.

The anode material is not limited herein. A particularly preferred anode material is a metal and a particularly preferred metal is a valve metal or a conductive oxide of a valve metal. Particularly preferred anodes include niobium, aluminum, tantalum and NbO without limit thereto.

The dielectric is not particularly limited herein. A particularly preferred dielectric is an oxide of the anode due to manufacturing considerations.

Throughout the description the term "equivalent hole diameter" or equivalent diameter" refers to a hole wherein the cross-sectional area is the same as that of a circle with the stated diameter.

EXAMPLES

Comparative Example 1

A 4 L plastic jar, provided with a cooling jacket, was initially charged with 125 g of polystyrene sulfonic acid (PSSA), 3375 g of DI water, 28.5 g of 1% iron(III) sulphate, and 21.5 g of sodium peroxodisulphate. The contents were mixed using a stirrer as shown in FIG. 1. Subsequently, 11.25 g. of 3,4-ethylenedioxythiophene (PEDOT) was added dropwise. The reaction mixture was stirred continuously for an additional 23 hours. The shear speed was adjusted to 2100 RPM. The shear speed was 2100 RPM since a vortex was not capable above 2100 RPM with the reaction mixture and volume.

The viscosity of the dispersion was measured using a Brookfield viscometer. The particle size was measured using a disk centrifuge particle size analyzer from CPS instruments. The conductivity was measured by coating the dispersion with 8% DMSO on a glass slide followed by drying at 150° C. and measuring the resistance by a four point probe.

Comparative Example 2

The experiment was repeated similar to Comparative Example 1 except that the stirrer used was a high shear impeller shown in FIG. 2. The shear speed was 900 RPM since the liquid vortex was not stable above 900 RPM with the reaction mixture and volume.

Inventive Example 1

A 4 L plastic jar, provided with a cooling jacket, was initially charged with 125 g of PSSA, 3375 g of DI water, 28.5 g of 1% iron(III) sulphate, and 21.5 g of sodium peroxodisulphate. The input percent solid was 1.37%. The contents were mixed using a rotor-stator mixing system with perforated stator screen with square holes with a size of 2.54 mm. Subsequently, 11.25 g of 3,4-ethylenedioxythiophene (PEDOT) was added dropwise. The reaction mixture was sheared continuously with a varying shear speed from 3000 RPM to 6000 RPM with the rotor-stator mixing system for an additional 23 hours. The dispersion was treated with cationic and anionic exchanger and filtered. The viscosity of the dispersion was measured using a Brookfield RVII viscometer using spindle number 3. The particle size was measured using a disk centrifuge particle size analyzer from CPS instruments with particle size reported as weight median herein. The conductivity was measured by coating the dispersion with 8% DMSO on a glass slide followed by drying at 150° C. and measuring the resistance by a four point probe. Inductively coupled plasma was used to determine the residual iron and sodium in the dispersion.

Inventive Example 2

The experiment was repeated similar to Inventive Example 1 except that the shear speed was fixed at 6000 RPM throughout the reaction.

Inventive Example 3

The experiment was repeated similar to Inventive Example 1 except that a perforated stator screen with circular holes with diameter of 1.6 mm was used.

Inventive Example 4

The experiment was repeated similar to Inventive Example 1 except that the percent input solid was changed from 1.3 to 1.79%

Inventive Example 5

The experiment was repeated similar to Inventive Example 1 except that the percent input solid was increased to 1.79%

Inventive Example 6

The experiment was repeated similar to Inventive Example 1 except that the percent input solid was changed from increased to 2.6%

Inventive Example 7

The experiment was repeated similar to Inventive Example 1 except that the percent input solid was changed from increased to 3.2%

Inventive Example 8

The experiment was repeated similar to Inventive Example 1 except that the percent solids was increased to 2.3% and a steric stabilizer polyethylene oxide (40 g, 1%) was added to the reaction mixture.

The results for Comparative Examples 1 and 2 and Inventive Examples 1-5 are in Tables 1-4.

TABLE 1

Comparative examples

| Process | Shear (RPM) | Mean particle size (nm) | Viscosity, cP @20 RPM |
|---|---|---|---|
| Comparative Example 1 | 2100 | 488 | 85 |
| Comparative Example 2 | 900 | 478 | 345 |

TABLE 2

Inventive examples - Control of particle size

| Process | Rotational speed (RPM) and Shear Rate (sec$^{-1}$) | Mean particle size (nm) | Viscosity, cP @20 RPM |
|---|---|---|---|
| Inventive Example 1 | 3000-6000 ramped (21,800-43,600) | 237 | 320 |
| Inventive Example 2 | 6000 fixed (43,600) | 110 | 145 |
| Inventive Example 3 | 6000-10000 ramped (43,600-72,600) | 85 | 100 |

TABLE 3

Inventive examples - Higher solids and higher viscosity processability

| Process | % input solids | Shear rate during polymerization | Viscosity, cP @20 RPM | Conductivity (s/cm) |
|---|---|---|---|---|
| Inventive Example 2 | 1.3 | 43600 sec$^{-1}$ | 145 | 150 |
| Inventive Example 4 | 1.79 | 43600 sec$^{-1}$ | 1560 | 180 |
| Inventive Example 5 | 2.6 | 43600 sec$^{-1}$ | 3065 | 220 |
| Inventive Example 6 | 3.6 | 43600 sec-1 | 5890 | 270 |

TABLE 4

Inventive examples - steric stabilizer processability

| Process | Rotational speed (RPM) and Shear Rate (sec$^{-1}$) | Percent solid | Viscosity, cP @20 RPM |
|---|---|---|---|
| Inventive Example 2 | 6000 fixed (43,600) | 1.3 | 145 |
| Inventive Example 5 | 3000-6000 ramped (21,800-43,600) | 2.3 | 3700 |

Inventive Experiment 1 was repeated with stator screens having differing hole sizes to demonstrate the particle size achieved. The results are presented in Table 5.

TABLE 5

Effect of shear rate and stator screen diameter on the PEDT:PSSA particle size

| Stator screen hole equivalent diameter | 3000 RPM (21800 sec$^{-1}$) | 6000 RPM (43600 sec$^{-1}$) | 6000 RPM + 10000 RPM (1 hr) (43600-72600 sec$^{-1}$) |
|---|---|---|---|
| 9.5 mm | 472 nm | 270 nm | |
| 2.54 mm | 318 nm | 151 nm | 72 nm |
| 1.6 mm | 166 nm | 108 nm | 80 nm |

The inventive examples demonstrate that the particle size and the viscosity can be controlled by the intelligent choice of stator screens, shear speed, and reaction conditions. These examples also demonstrate that a particle size below about 150 nm, and more preferably below about 100 nm, can be prepared by proper choice of the stator screen diameter. Furthermore, these examples demonstrate that a higher solids dispersions with high viscosity can be prepared using this mixer system. It was also surprisingly found that the conductivity can be increased by increasing the input % solid. Prior art conductive polymerization conditions lack the capability of processing high solid dispersions due to high viscosity and thus the artisan has not been not able to discover the conductive enhancement obtained by increasing percent input solid Inventive Example 9

A 4 L plastic jar, provided with a cooling jacket, was initially charged with 125 g of PSSA, 3375 g of DI water, 28.5 g of 1% iron(III) sulphate, and 21.5 g of sodium peroxodisulphate. Polyethylene oxide (40 gm, 10%) was used as a steric stabilizer in this example. The contents were mixed using a rotor-stator mixing system with a perforated stator screen with square holes with a size of 2.54 mm. Subsequently, 11.25 g of 3,4-ethylenedioxythiophene was added dropwise. The reaction mixture was continued to be sheared with a varying shear speed from 3000 RPM to 6000 RPM with the rotor-stator mixing system for additional 23 hours. Conductivity enhancing additives such as DMSO and other additives such as silane coupling agents can be added to the reaction mixture in the final hour of the reaction or optionally added after the ion exchange treatment. The dispersion was treated with a cationic and anionic exchanger and filtered. The conductive polymer dispersion thus prepared was directly coated on a solid electrolytic capacitor. For the prior art comparative examples, a commercial conductive polymer dispersion and a PEDT:PSSA dispersion prepared by prior art method followed by adding a binder, was compared with the inventive example. Equivalent Series Resistance (ESR) of the comparative and inventive parts are shown in Table 6.

TABLE 6

Comparative and inventive example from Example 9

| Process | Prior Art Clevios KV2 Post polymerization binder | PEDOT:PSSA With Post polymerization binder addition | Present Invention PEDOT:PSSA with steric stabilizer |
|---|---|---|---|
| Pre RBI ESR (mohm) (Batch 1) | 42.8 | 38.78 | NA |
| Pre RBI ESR (mohm) (Batch 2) | NA | 45.8 | 42 |
| Pre RBI Leakage (microamp) (Batch 1) | 43.8 | 5.44 | NA |
| Pre RBI Leakage (microamp) (Batch 2) | NA | 4.1 | 1.69 |

Inventive Example 10

A 4 L plastic jar, provided with a cooling jacket, was initially charged with 125 g of PSSA, 3375 g of DI water, 28.5 g of 1% iron(III) sulphate, and 21.5 g of sodium peroxodisulphate. The contents were mixed using a rotor-stator mixing system with a perforated stator screen with square holes with a size of 2.54 mm or an equivalent circular area of 6.54 mm$^2$. Subsequently, 11.25 g of 3,4-ethylenedioxythiophene was added dropwise. The reaction mixture was sheared continuously with a varying shear speed from 3000 RPM to 6000 RPM with the rotor-stator mixing system for an additional 23 hours. The dispersion was treated with a cationic and anionic exchanger and filtered. The conductive polymer dispersion thus prepared was divided into four groups. Group A was used as filtered for the final dispersion formulation. Group B was homogenized using a Silverson rotor-stator mixer at a shear rate of 51,000 sec$^{-1}$ for 30 min. Group C was homogenized using a Branson ultrasound sonifier at 50% amplitude for 5 min. Group D was homogenized using the same sonifier at the same amplitude for 30 min. The conductive dispersions thus prepared using each method were mixed with conductive enhancers and additives separately and coated on a solid electrolytic 33 microfarad, 25V capacitor. Equivalent Series Resistance (ESR) of the parts from group A, B, C, D are shown in Table 7.

TABLE 7

Comparative and inventive example from Example 10

| Example 10 (group A-D) | Details | ESR (miliohms) after encapsulation |
|---|---|---|
| Group A | No post polymerization homogenization | 38.14 |
| Group B | Homogenized using silverson @ 51,000 sec−1 | 39.83 |
| Group C | Homogenized using Branson sonifier 50%, 5 min | 51.81 |
| Group D | Branson sonifier 50%, 30 min | 59.56 |

It can be seen that the postpolymerization homogenization methods have higher ESR. It can be further seen that the homogenization by ultrasound sonication gave significantly higher ESR than the parts without homogenization or with rotor-stator high shear rate homogenization. These results also suggest that polymerization using a rotor-stator method gives lower ESR than polymerization in a ultrasound irradiation condition.

The invention has been described with reference to preferred embodiments without limit thereto. One of skill in the art would realize additional embodiments and alterations which are not specifically stated but which are within the scope of the invention as more specifically set forth in the claims appended hereto.

The invention claimed is:

1. A process for preparing a conductive polymer dispersion comprising:
   providing a monomer;
   mechanically mixing said monomer to form droplets comprising said monomer; and
   polymerizing said monomer in said droplet with an oxidizer thereby forming particles of intrinsically conductive polymer with a particle size of no more than 200 nm.

2. The process for preparing a conductive polymer dispersion of claim 1 further comprising providing a polyanion with said monomer.

3. The process for preparing a conductive polymer dispersion of claim 2 wherein said polyanion is polystyrene sulfonic acid.

4. The process for preparing a conductive polymer dispersion of claim 3 wherein said polystyrene sulfonic acid has a molecular weight of at least 500 to no more than 200,000.

5. The process for preparing a conductive polymer dispersion of claim 1 wherein at least one conductive polymer is an optionally substituted polypyrrole, an optionally substituted polyaniline or an optionally substituted polythiophene.

6. The process for preparing a conductive polymer dispersion of claim 5 wherein said conductive polymer is polyethlenedioxythiophene.

7. The process for preparing a conductive polymer dispersion of claim 1 further comprising:
   providing at least one steric stabilizer with said monomer.

8. The process for preparing a conductive polymer dispersion of claim 7 wherein said steric stabilizer is selected from the group consisting of polyethylene oxide, fully hydrolyzed poly(vinyl alcohol), partially hydrolyzed poly(vinyl alcohol), poly(vinyl pyrollidone), hydroxyethyl cellulose, ethoxylated alkyl phenols, ethoxylated acetylenic diols, and polyethylene oxide copolymers.

9. The process for preparing a conductive polymer dispersion of claim 8 wherein said steric stabilizer is polyethylene oxide.

* * * * *